Aug. 6, 1929.  L. COGNEAU  1,723,409
ELECTRICAL MACHINE ROTOR
Filed June 20, 1928  2 Sheets-Sheet 1
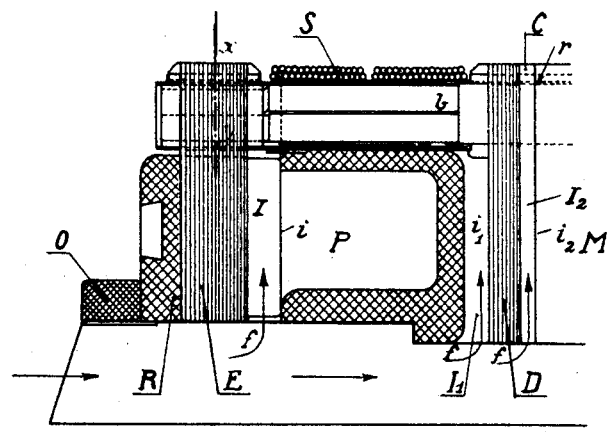
Fig.: 1
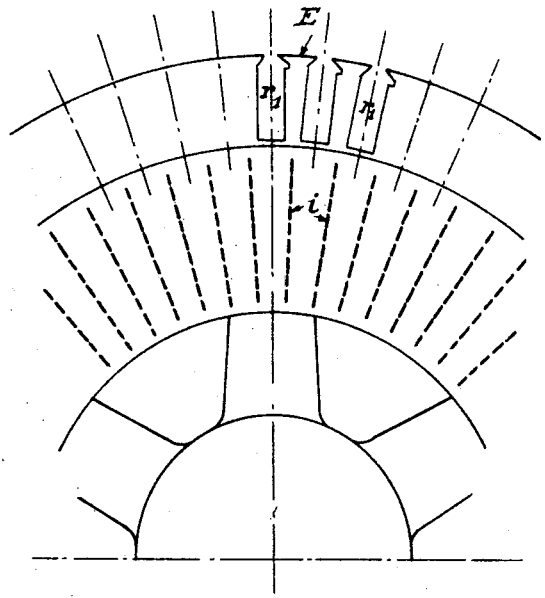
Fig.: 2
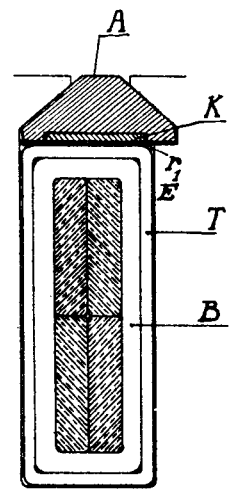
Fig.: 3
Inventor:—
Leopold Cogneau,
By:— Smith and Michael,
Attorneys.

Aug. 6, 1929.   L. COGNEAU   1,723,409
ELECTRICAL MACHINE ROTOR
Filed June 20, 1928   2 Sheets-Sheet 2
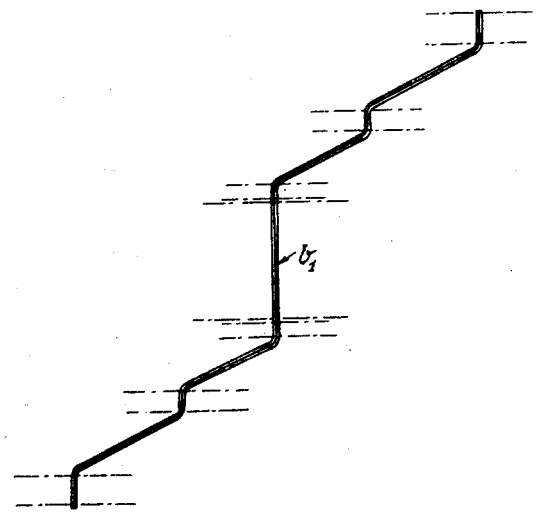
Fig.: 4
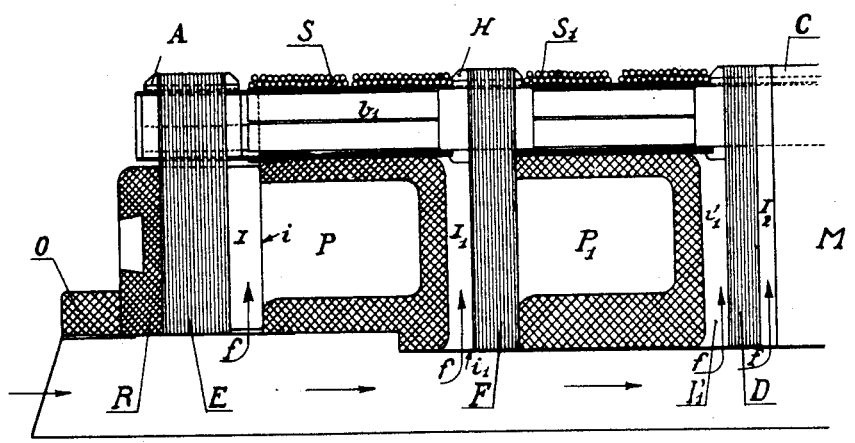
Fig.: 5
Inventor:—
Leopold Cogneau,
By:— Smith & Michael,
Attorneys.

Patented Aug. 6, 1929.

1,723,409

UNITED STATES PATENT OFFICE.

LEOPOLD COGNEAU, OF MONTIGNY SUR SAMBRE, BELGIUM, ASSIGNOR TO ATELIERS DE CONSTRUCTIONS ELECTRIQUES DE CHARLEROI, OF BRUSSELS, BELGIUM, A BELGIAN SOCIÉTÉ.

ELECTRICAL MACHINE ROTOR.

Application filed June 20, 1928, Serial No. 286,908, and in Belgium June 24, 1927.

This invention relates to high speed electrical machines, and it consists in improved means for securing and ventilating the windings upon the revolving parts of such machines.

Hitherto the revolving parts of very high speed continuous and alternating current machines have usually been arranged in the same manner as the majority of the rotors of turbo-alternators are constructed. The windings, consisting either of bars or of wires, are maintained in the slots of the magnetic mass by metallic or other keys or wedges. Outside the magnetic mass, the windings are retained by strong bindings or again by thick conical hoops centered on the one hand upon the magnetic mass and upon the other hand upon an intermediate support keyed upon the shaft of the machine.

These arrangements, although giving satisfaction from the mechanical point of view, do not ensure adequate cooling of the windings. It is not feasible to increase the current density in the conductors; consequently, it is necessary to maintain this current at a lower value and the electrical utilization of the material is not good.

The present invention has for its object to provide improved means for securing and ventilating the windings upon the revolving parts of high speed electrical machines, in such a way that the drawback mentioned above is no longer present. In addition, the improved means of the present invention offer the advantage of better utilization of the material by reason of the effective cooling of the heads of the coils, while allowing a less fragile system of winding.

According to the invention, the revolving part of a high speed electrical machine is constructed as follows:—

(1) In the magnetic mass, the windings are located in insulated slots and maintained in place by wedges, as in any other machine of the same kind.

(2) Outside the magnetic mass the heads of the coils are supported by a certain number of discs made of non-magnetic material of very high mechanical strength, of which the periphery presents grooves intended to receive the windings and to retain them against the centrifugal force due to the very rapid rotation of the revolving part in question.

(3) Supporting plates placed between the non-magnetic discs present intermediate ribs which bear against these discs and provide an air passage through the winding.

(4) The part of the winding located between the discs is held in place by bindings having the sole object of preventing the deformation of this part of the winding.

Upon the accompanying drawings, to which reference is made in the subsequent description, Figures 1 to 3 represent diagrammatically one example of carrying out the present invention.

Of these, Figure 1 is a longitudinal section showing the part of the winding located outside the magnetic mass of a high speed electrical machine rotor. Figure 2 is a partial end view showing in particular one of the discs of non-magnetic material. Figure 3 is a transverse section on a larger scale, taken along the line $x$—$y$ of Figure 1.

Figure 4 shows the shape of one conductor bar of a winding of the same kind as that located in the rotor represented in Figures 1 to 3, but of which the extension or development of the conductor outside the slots of the magnetic mass is greater.

Figure 5 is a partial section corresponding to Figure 1, and showing by way of modification the arrangement of the various elements when the conductor bar has the conformation represented in Figure 4.

Upon all these figures the same reference letters designate the same parts or elements.

The magnetic mass M comprises as usual on its periphery, open or partially closed slots $r$, in which are located the bars $b$ of the windings, these being carefully insulated for the whole of their length. The bars $b$ are maintained in place in the slots $r$ by wedges C (see Figure 1).

In order to ensure the rigidity and the fixation of the winding system, there are provided discs D and E made of non-magnetic material, centred and clamped upon the shaft; one disc D is placed against the magnetic mass M but maintained at a certain distance from the latter by ribs $i_2$ providing inervals $I_2$ forming ventilating channels, the other disc E at the end of the winding to the right of the end connectors. These discs D and E may each be made in a single piece or built up by a stack of thin sheets of non-magnetic material. They are separated by a supporting plate P of special shape, presenting intervening ribs $i$ $i_1$ which bear respectively upon the discs E and D and of which the purpose will be described hereafter.

Lastly, the whole assembly is maintained by an external plate R bearing directly upon the disc E and held fast by a nut O.

In the end fixing disc E, there are formed notches or slots $r_1$ (Figure 2) of larger size than the slots $r$ in the magnetic mass, in such a way as to allow the insertion of insulating tubes T surrounding the connector clips B of the elements of the bar $b$ to be connected. The section represented in Figure 3 shows the cross-section transverse to a notch $r_1$.

The slots $r_1$ may assume for example at their periphery the trapezoidal shape shown in Figures 2 and 3. Wedges A of corresponding shape, made of non-magnetic metal, are inserted therein so as to retain the bars of the winding passing through the disc E. The said wedges themselves present on their inner side a groove of rectangular cross-section, into which there is slipped a locking plate K which is intended to prevent the wedges A from sliding out of the slots $r_1$.

The fixing disc D is slotted in the same way as the laminations of the magnetic mass. The retention of the winding in the radial direction at this point is obtained by the prolongation of the wedges C to beyond the disc.

The intervening ribs $i$ and $i_1$ of the supporting plate P, which bear respectively upon the discs E and D, as has already been explained, provide between these latter and the supporting plate P proper a number of gaps or intervals I $I_1$ forming ventilating channels and allowing the passage of air through the winding.

Ventilation is ensured by the passage of air in the direction shown by the arrows $f$ through the gaps or intervals I $I_1$ $I_2$, fed by the channels existing between the ribs or splines of the shaft. In the case where the shaft is cylindrical without any ribs or splines, the passage of air would take place through apertures provided for that purpose in a suitable supplementary member surrounding the shaft.

Lastly, bindings S in the form of bands or wires of steel or any other suitable material, prevent the deformation of the extended or developed part of the winding comprised between the non-magnetic discs E and D, which part of the winding they press against the periphery of the supporting plate P, thereby obtaining proper centering of the extensions or developments upon the said plate P. This latter, being concentric with the shaft, ensures an even distribution of the sections of the winding upon the same cylindrical surface in order to make a perfectly regular drum.

The fixing discs, which are to the number of two in the example of construction described with reference to Figures 1 to 3, may be more numerous if necessary and in particular if the bars of the winding have a considerable development or extension outside the slots $r$ of the magnetic mass, as is the case for the bar $b_1$ shown in Figure 4.

In this case the securing and ventilating device according to the present invention is arranged as represented in Figure 5; there are three fixing discs E F D made of non-magnetic material; the supplementary disc F presents at its periphery slots exactly similar to those of the disc D, and it affords an intermediate support between the discs E and D; the bars of the winding are held therein by trapezoidal wedges H.

Between the discs E and F there is located the supporting plate P with intermediate ribs $i$ $i_1$. Between discs F and D there is introduced another supporting plate $P_1$ having intervening ribs $i'_1$ which bear against the disc D and provide between these latter and the supporting plate $P_1$ an interval $I'_1$ forming a supplementary ventilation channel. Lastly, bindings $S_1$, similar to the bindings S, ensure the fixing of the part of the winding located between the discs F and D and resting upon the supporting plate $P_1$.

It is naturally permissible, without exceeding the scope of the invention, to arrange the constituent elements of the improved securing and ventilating means for windings upon the rotary parts of high speed electrical machines, in such a way as to obtain modifications operating practically in the same manner as the above described examples of the application of the invention.

What I claim is:—

1. In an electrical machine rotor having conductors extending beyond the magnetic mass, means for securing the projecting extensions of said conductors, comprising discs of non-magnetic material, said discs being notched at their peripheries to receive said projecting extensions, a supporting member mounted between said discs, means for wedging said extensions in the notches at the peripheries of said discs, and a binding around the intermediate portions of said extensions, said binding adapted to hold said intermediate portions upon the circumference of said supporting member.

2. In an electrical machine rotor having conductors extending beyond the magnetic mass, means for securing the projecting extensions of said conductors, comprising discs of non-magnetic material, said discs being notched at their peripheries to receive said projecting extensions, a supporting member mounted between said discs, ribs upon said suporting member, said ribs affording channels for the outward passage of air between said member and said discs, means for wedging said extensions in the notches at the peripheries of said discs, and a binding around the intermediate portions of said extensions, said binding adapted to hold said intermediate portions upon the circumference of said supporting member.

3. In an electrical machine rotor having conductors extending beyond the magnetic mass, means for securing the projecting extensions of said conductors, comprising discs of non-magnetic material, said discs being notched at their peripheries to receive said projecting extensions, a supporting member mounted between said discs, ribs upon said supporting member, ribs upon the disc nearest to the magnetic mass, said ribs affording channels for the outward passage of air between said member, said discs and said magnetic mass, means for wedging said extensions in the notches at the peripheries of said discs, and a binding around the intermediate portions of said extensions, said binding adapted to hold said intermediate portions upon the circumference of said supporting member.

4. In an electrical machine rotor having conductors extending beyond the magnetic mass, means for securing the projecting extensions of said conductors, comprising discs of non-magnetic material, said discs being notched at their peripheries to receive said projecting extensions, a supporting member mounted between said discs, said extensions being wedged in the notches at the periphery of the disc nearest to the magnetic mass by the means wedging the respective conductors in the slots of said magnetic mass, independent means for wedging the further ends of said extensions in the notches at the periphery of the other disc, and a binding around the intermediate portions of said extensions, said binding adapted to hold said intermediate portions upon the circumference of said supporting member.

5. In an electrical machine rotor having conductors extending beyond the magnetic mass, means for securing the projecting extensions of said conductors, comprising discs of non-magnetic material, said discs being notched at their peripheries to receive said projecting extensions, a supporting member mounted between each two adjacent discs, means for wedging said extensions in the notches at the peripheries of said discs, and bindings around the intermediate portions of said extensions between each two adjacent discs, said bindings adapted to hold said intermediate portions upon the circumferences of said supporting members.

6. In an electrical machine rotor, comprising a slotted magnetic core with conductors mounted in the slots, said conductors projecting beyond said magnetic core at the ends of said slots, means for securing and ventilating the projecting portions of said conductors, said means comprising a plurality of discs of non-magnetic material, said discs being notched at their peripheries to receive said projecting portions, the notches in the disc adjacent to said magnetic core being substantially similar to the slots in said magnetic core, wedges securing said conductors in said slots and being continued into the respective notches of said adjacent disc, intermediate supports arranged between said discs, said supports having cylindrical external circumferences and ribbed end faces, said ribbed faces adapted to provide channels for the outward passage of air between said discs and said intermediate supports, wedges securing said projecting portions in the notches of said discs remote from said magnetic core, and means for binding said projecting portions intermediate between said discs around the circumferences of said intermediate supports.

In testimony whereof I hereunto affix my signature.

LEOPOLD COGNEAU.